United States Patent [19]

Bauer

[11] 4,318,536
[45] Mar. 9, 1982

[54] AXIALLY ADJUSTABLE PNEUMATIC SPRING

[75] Inventor: Fritz Bauer, Altdorf, Fed. Rep. of Germany

[73] Assignee: Fritz Bauer & Söhne oHG, Altdorf, Fed. Rep. of Germany

[21] Appl. No.: 114,652

[22] Filed: Jan. 23, 1980

[30] Foreign Application Priority Data

Feb. 23, 1979 [DE] Fed. Rep. of Germany ....... 2907100

[51] Int. Cl.³ .............................................. F16F 9/48
[52] U.S. Cl. ................................. 267/64.12; 188/284; 188/300
[58] Field of Search .................. 267/8 A, 64 R, 65 R, 267/64.12; 188/284, 300

[56] References Cited

U.S. PATENT DOCUMENTS

| 3,656,593 | 4/1972 | Bauer | 188/300 |
| 3,711,054 | 1/1973 | Bauer | 248/400 |

FOREIGN PATENT DOCUMENTS

| 638166 | 4/1964 | Belgium | 267/65 R |
| 1012192 | 7/1957 | Fed. Rep. of Germany | 188/284 |
| 2516478 | 10/1976 | Fed. Rep. of Germany | 267/65 R |
| 2742224 | 3/1979 | Fed. Rep. of Germany | 267/65 R |
| 1402849 | 8/1975 | United Kingdom | 267/65 R |
| 261832 | 6/1970 | U.S.S.R. | 188/284 |

*Primary Examiner*—Gregory N. Clements
*Attorney, Agent, or Firm*—Browdy and Neimark

[57] ABSTRACT

A pneumatic spring for use, for example, as a lifting device or support strut for a chair or the like with provision for the adjustment of axial extent. The pneumatic spring is substantially composed of a telescoping cylinder-piston assembly containing a gas and/or fluid under compression. A releasable valve assembly permits the relative position of the piston with respect to the housing to be adjusted arbitrarily. In order to provide for a terminal spring stiffening in the position of near full insertion of the piston rod, the invention provides that a pin extending from the main piston enters a central volume which is thereby sealed off from the remainder of the internal volume. Accordingly, the gas in the remaining available volume is compressed more highly and exerts an increased opposing force on the primary piston during its final insertion.

5 Claims, 1 Drawing Figure

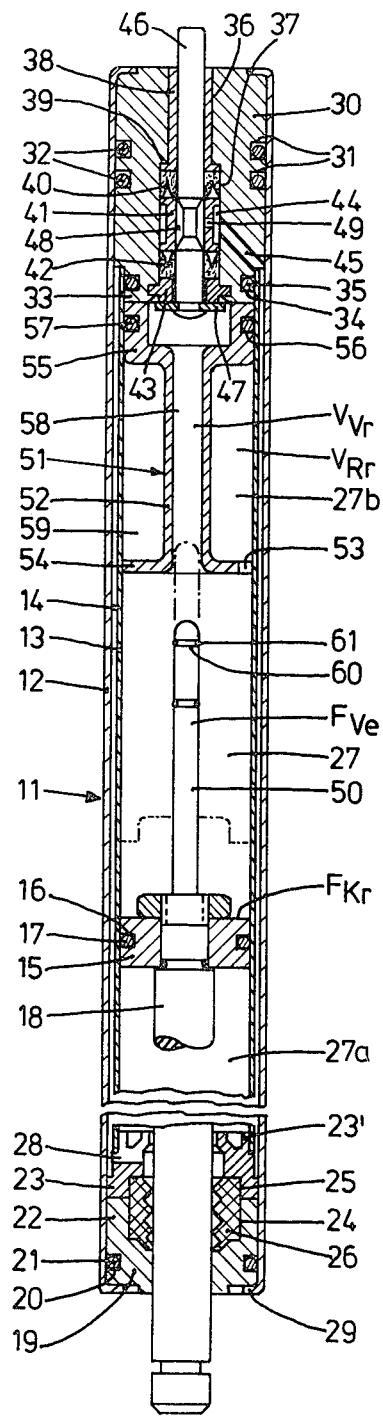

4,318,536

AXIALLY ADJUSTABLE PNEUMATIC SPRING

FIELD OF THE INVENTION

The invention relates to pneumatic springs, i.e., telescoping cylinder-piston assemblies, in which a trapped, compressed gas and/or fluid provides axial resiliency and an overall elastic support for an associated apparatus, for example a chair and the like. More particularly, the invention relates to an adjustable pneumatic spring which has a terminal stiffening feature which insures that the insertion force is increased when the pneumatic spring is fully or nearly fully collapsed so as to prevent undesirable bottoming.

BACKGROUND AND PRIOR ART

Axially adjustable gas springs are known, for example, from the German laid-open application 27 42 224. In this publication is described a pneumatic spring with supplemental elastic stiffening, i.e., a so-called terminal stiffening, which is attained by embodying the piston of the telescoping spring as an additional, supplementary gas spring. In this way, the device supplies additional springing independently of the relative position of the piston rod with respect to the housing. One of the disadvantages of this known spring is that the supplemental pneumatic spring must be filled with working fluid in a separate step. The basic axially adjustable gas spring without terminal stiffening is known also, for example, from U.S. Pat. No. 3,656,593.

The Belgian Pat. No. 638 166 describes a hydraulic or pneumatic piston cylinder assembly with an axially slidable piston attached to a piston rod that emanates sealingly from the housing. The piston has a continuation which enters a coaxial recess in a sealing manner when the piston is moved into the cylinder. The recess is connected to a source of pressure via a suitable line and the wall of the recess has a lip seal which attaches to the piston continuation. When a pressurized medium is applied to the side of the piston adjacent to the piston rod, the piston enters the housing so that the fluid on the other side of the piston is pushed out of the aforementioned recess. At the moment when the continuation enters the recess however, the lip seal seals it so that the fluid can no longer pass from the volume defined between the piston and the lower part of the housing so that the pressure within the housing rises and increases the force opposing the inward motion of the piston, constituting an auxiliary gas spring opposing final entry of the piston into the housing.

Further known in the art is a simple pneumatic spring described in the British Patent 1 402 849. Described there is a telescoping cylinder/piston assembly with a supplementary guide piston having passages which provide communication between the volumes defined on either side of the piston. A simple pneumatic spring of this type acts substantially like a mechanical helical spring, i.e., its axial extent is not adjustable. However, the pneumatic spring described in the aforementioned publication also has an extension that becomes associated with a cylinder of reduced diameter and located at the closed end of the housing. Accordingly, in the terminal stages of insertion, the piston extension enters the section of reduced diameter and increases the resistance to further insertion as well as providing an increased initial expulsion force.

OBJECT AND SUMMARY OF THE INVENTION

It is a principal object of the present invention to provide a pneumatic spring capable of axial adjustment of its effective extent and equipped with simple yet reliable means for providing a terminal supplemental stiffening of the spring characteristics of the spring.

This and other objects are attained according to the invention by providing that the working piston of the spring is extended by a coaxial continuation which acts as a valve closing element and cooperates with a coaxial cylindrical space while at the same time closing off that space to communication with the remainder of the internal volume of the spring.

Furthermore, the cylindrical space entered by the valve closing element attached to the piston is larger than the volume displaced by that element. However, the reduced volume of the remaining space offers a higher-than-normal compression to the primary piston of the spring and thus provides for effective terminal stiffening. The cylindrical space entered by the piston extension as well as the remaining volume available for compression by the primary piston are both defined in simple manner by providing a valve chamber bushing, the central cylindrical portion of which is entered by and cooperates with the extension on the primary piston. It is a particularly favorable characteristic of the invention that the pneumatic spring may be provided with different terminal characteristics by inserting differently dimensioned valve chamber bushings and these may be made in a very simple step, for example as single extruded parts.

Still other advantages and characteristics of the invention are contained in the following detailed description of an exemplary embodiment thereof which relates to the drawing.

DESCRIPTION OF THE DRAWING

The single FIGURE of the drawing is an axial section through an adjustable pneumatic spring according to the invention.

DESCRIPTION OF THE PREFERRED EMBODIMENT

The axially adjustable pneumatic spring illustrated in the FIGURE includes a housing 11 consisting of two coaxial tubes 12, 13 of different diameter. The difference in the diameters of the tubes 12, 13 is sufficient to define between them a narrow cylindrical channel 14.

Sliding within the inner tube 13 is a substantially disc-shaped piston 15 attached to a piston rod 18 that emerges coaxially from the housing. The piston is sealed with respect to the internal surfaces of the tube 13 by a suitable gas seal 17 while the piston rod 18 is sealed with respect to the housing by a labyrinth lip seal 26 which is seated in suitable recesses 24, 25 of elements 22, 23 which together define an end plug 19. The plug 19 has an external annular groove 20 in which a ring seal 21 is located so as to prevent the passage of gas past the external surface of the plug 19. The labyrinth seal 26 is under sufficient compression to prevent any gas or fluid from passing the external surface of the piston rod 18. The plug 19 has a centering extension 23' on which the inner tube 13 is firmly pressed. A recess 28 provides permanent communication between the cylindrical channel 14 and the internal housing volume 27a defined between the piston 15 and the plug 19. The rim 29 of the outer tube 12 is suitably bent over to hold the plug 19 in position and prevent its emergence from the housing 11.

At the other end of the housing 11, the external tube 12 extends beyond the internal tube 13 and surrounds a substantially cylindrical valve assembly 30, the hermetic seal between the internal surface of the tube 12 and the valve assembly 30 being assured by sealing rings 32 residing in annular grooves 31. At the end adjacent to the internal volume 27, the valve assembly 30 has an extension 33 whose diameter permits the internal tube 13 to be firmly seated thereon. Hermetic sealing between the tube 13 and the extension 33 is insured by a ring seal 35 residing in an annular groove 34 of the extension 33.

The valve assembly has two sequential coaxial internal bores 36, 37 of different diameter which together extend throughout the length of the assembly 30. The smaller bore 36 contains a guide bushing 38 held in place by a flange 39 that makes contact with the shoulder defining the transition of the bore 37 to the bore 36 and thus insures that the guide bushing 38 cannot be expelled from the valve assembly 30.

Disposed within the large diameter bore 37 is an annular lip seal 40 which makes contact with the flange 39 at one end and with a spacer sleeve 41 which is followed by another lip seal 42. A safety ring placed within the bore 37 and held therein by deformation of the rim of the valve assembly 30 secures the lip seals 40,42 and the spacer sleeve 41 within the valve assembly. A groove 44 around the outside of the spacer sleeve 41 provides for communication through an oblique channel 45 in the wall of the valve assembly 30 with the cylindrical channel 14. The guide bushing 38 guides a plunger 46 which passes through the entire length of the valve assembly 30 and has a disc 47 at one end which makes contact with the safety sleeve 43 when the valve is closed. A central section of reduced diameter in the plunger 46 defines a space 48 which, in the position of the plunger illustrated in the drawing, is located within the spacer bushing where it communicates with a bore 49 in the spacer sleeve. In the illustrated position, the transition space 48 is thus located between the two annular lip seals 40, 42, one lip of each of which makes contact with the inside wall of the bore 37 while the other makes sealing contact with the surface of the valve plunger 46. The valve assembly 30 is secured within the housing 11 by suitable deformation of the rim of the outer tube 12.

When the valve plunger 46 is pushed into the housing 11, i.e., when the end of the plunger 46 equipped with the stop disc 47 enters the volume 27b defined between the piston 15 and the valve assembly 30, the transition space 48 bridges the lip seal 42 adjacent to the space 27 so that a direct communication is now provided between the partial volume 27b and the cylindrical channel 14 which is always connected to the partial volume 27a. The passage of gas or fluid is made possible by the fact that the diameter of the central hole in the safety bushing 43 is somewhat greater than the diameter of the valve plunger 46 which passes through it. The pneumatic spring which may contain pressurized gas only, or may also contain a hydraulic fluid and as described so far operates as follows. The rest position of the valve plunger 46, which is illustrated in the drawing, prevents any flow of gas or fluid through the valve assembly 30 so that the piston 15 and the piston rod 18 are in a static quiescent condition with respect to the average axial position of the housing, although the elastic movement of the piston to either side of the neutral position is made possible by the compressibility of the gas cushion existing on both sides of the piston in the partial volumes 27a and 27b respectively. In order to change the relative axial position of the piston 15 i.e. in order to change the overall effective length of the pneumatic spring, the valve plunger 46 is pushed into the valve assembly 30 until the transit space 48 bridges the lower lip seal 42 adjacent to the internal volume 27 so that a gas flow may take place from the partial volume 27b defined between the piston 15 and the valve assembly 30, through the cylindrical gap between the safety bushing 43 and the valve plunger 46, further through the transit region 48, the bore 49 in the spacer sleeve 41, the annular space 44, the channel 45, the cylindrical channel 14 defined between the inner tube 13 and the outer tube 12, the recess 28 in the portion 23 of the plunger 19 all the way into the partial housing volume 27a. A flow of fluid and/or gas is also possible, of course, in the opposite direction. If the pneumatic spring is not loaded subsequent to the opening of the valve assembly 30, i.e., subsequent to the insertion of the valve plunger 46, the prevailing gas pressure tends to move the piston rod 18 outwardly. However, if the piston rod 18 is loaded externally it may be pushed into the housing 11 while the plunger 46 is depressed.

The foregoing description and function relate to a pneumatic spring of known construction.

The special features which are provided according to the present invention derive from supplying the piston 15 with a coaxial extension and closure pin 50 which protrudes from the end of the piston remote from the piston rod 18. This closure pin 50 cooperates with the central channel of a valve space limiting sleeve 51 which has a narrow cylindrical channel 52 followed by an annular flange 54 that locates it within the inner tube 13 and has an opening 53 permitting the passage of gas therethrough to a chamber 59. The other end of the sleeve or valve chamber bushing 51 defines an enlarged section 55 whose end face makes contact with the valve assembly 30 and which has an annular groove 56 carrying a ring seal 57 that provides for hermetic seal with respect to the internal wall of the inner tube 13. The enlarged section 55 and the cylindrical portion 51 together define a valve volume 58 which is intended to be substantially larger than the volume of the closure pin 50. The diameter and depth of the valve space 58 in the region of the enlarged end 55 are sufficiently great to permit the movement of the plunger 46 and the disc 47 without hindrance.

The various dimensions of the sleeve 51 are such that when the closure pin 50 has entered the cylindrical part 52 of the internal valve volume 58, the remaining space 59 is small in volume with respect to the volume displaced by the effective surface of the piston 15, i.e., after subtraction of the cross-sectional area of the closure pin 50. At the free end, the closure pin 50 has a ring seal 61 residing in a groove 60 which seals the valve space 58 with respect to the partial volume 27b after the closure pin 50 enters the cylindrical portion 51.

The gas compression within the valve space 58 due to the entry of the closure pin 50 is relatively small due to the fact that the volume of the valve space 58 is larger than the volume displaced by the closure pin 50. Accordingly, the force exerted on the closure pin 50 in the direction opposite to the insertion of the piston rod 18 is relatively small. However, the compression in the remaining space 59 which becomes effective after the valve space 58 is separated from the partial volume 27b by the entry of the closure pin 50 is relatively high due to the opposite volumetric ratios that obtain, so that a relatively high expulsion force is exerted on the annular end face of the piston 15 and hence also on the piston rod 18. The sum of the forces acting on the closure pin 50 and on the remaining annular cross-sectional end face of the piston 15 is greater than the force which would act if the closure pin 50 were not present and the entire end face area of the piston 15 were effective. This difference is due to the fact that the closure pin 50 separates a part of the partial volume 27b which was previously available as soon as the closure pin 50 enters the valve space 58 sealingly.

The mathematical relations between the forces and volumes obey the following relation:

$$F_{Kr} \cdot F_{Ve} > V_{Rr} \cdot V_{Vr}$$

$F_{Kr}$ = annular end face area of piston (15)
$F_{Ve}$ = cross section area of closure pin (50)
$F_{Rr}$ = remaining volume (59)
$V_{Vr}$ = valve space volume (58)

By supplying a sleeve 51 and a closure pin 50 which appropriately define the spaces in the manner described above, the pneumatic spring exhibits an increased terminal spring stiffness, i.e., the curve describing the spring force as a function of axial piston movement steepens sharply. This is due to the fact that, after the closure pin 50 sealingly enters the cylindrical portion 52 of the sleeve 51, the gas which is located in the remaining space 59 is highly compressed when the piston 15 enters the housing 11. If it is desirable to change the terminal stiffness somewhat, the valve assembly 30 may be opened after the closure pin 50 has entered the valve space 58 so that some of the gas in the valve space 58 may migrate in the manner previously described to the partial volume 27a on the other side of the piston 15.

One of the preferred and advantageous applications of the pneumatic spring according to the present invention is as an integral construction element of, for example, a chair support column such as described, for example, in the U.S. Pat. No. 3,711,054.

A preferred embodiment of the invention, illustrated for example in the drawing, may suitably have the following approximate dimensions.

$F_{Kr}$ = 2.945 cm² area of closure pin
$F_{Ve}$ = 0.196 cm² effective area of piston 15
$V_{Rr}$ = 17 cm³ remaining volume 59
$V_{Vr}$ = 1.96 cm³ volume 58 Using these numbers, the ratio of areas becomes $$F_{Kr} \cdot F_{Ve} = 2.945:0.196 = 15.03$$

and the ratio of volumes becomes $$V_{Rr} \cdot V_{Vr} = 17:1.96 = 8.67$$

so that the above-indicated inequality is obeyed.

The foregoing description of the invention by means of a preferred but non-limiting example is subject to various changes and modifications by a person skilled in the art without departing from the scope of the invention.

I claim:

1. A pneumatic spring, including a housing having first and second ends and consisting of an inner tube coaxially residing within an outer tube, said tubes together defining a cylindrical channel, and further including a piston having an end face and sealingly guided in said inner tube and attached to a piston rod which sealingly emerges from said first end of said housing through a sealing plug, and further including valve means disposed at and sealing the second end of said housing, said valve means including an axially displaceable plunger for controlling communication between the interior volume of said inner tube and said cylindrical channel, and wherein there are provided auxiliary pneumatic means for inhiting inward movement of said piston rod as said piston approaches said valve means, said auxiliary pneumatic means comprising:

an auxiliary valve chamber having a central bore and a coaxial chamber separated from said central bore, said auxiliary valve chamber being located in said inner tube between said valve means and said piston;

a valve-closing element disposed on the end face of said piston remote from said piston rod, for entering said auxiliary valve chamber and sealing it to define a volume downstream thereof in said auxiliary valve chamber and a volume upstream thereof; said coaxial chamber being in communication with the interior volume of said inner tube, and the relative dimensions of said auxiliary valve chamber and of said valve-closing element are such that when said auxiliary valve chamber is closed by said valve-closing element, the ratio of the effective annular area of the end face of said piston carrying said valve-closing element to the effective crossectional area of said valve-closing element is greater than the ratio of said remaining volume to the volume of said auxiliary valve chamber.

2. A pneumatic spring according to claim 1, wherein said auxiliary valve chamber is defined by a valve chamber bushing disposed in said inner tube.

3. A pneumatic spring according to claim 2, wherein said valve chamber bushing is placed in contact with said valve means.

4. A pneumatic spring according to claim 2, wherein said valve chamber bushing makes sealing contact with the interior wall of said inner tube.

5. A pneumatic spring according to claims 2, 3 or 4, wherein said valve chamber bushing defines a valve chamber having a first cylindrical portion corresponding to said central bore and of diameter substantially smaller than the internal diameter of said inner tube, and a second cylindrical portion of diameter greater than the diameter of said first cylindrical portion, said second cylindrical portion lying adjacent said valve means.

* * * * *